June 14, 1927.

A. H. KOGGE 1,632,607

DISPLAY DEVICE

Filed Oct. 26, 1926

WITNESSES

INVENTOR
Arthur H. Kogge
BY
ATTORNEY

June 14, 1927.
A. H. KOGGE
1,632,607
DISPLAY DEVICE
Filed Oct. 26, 1926   2 Sheets-Sheet 2
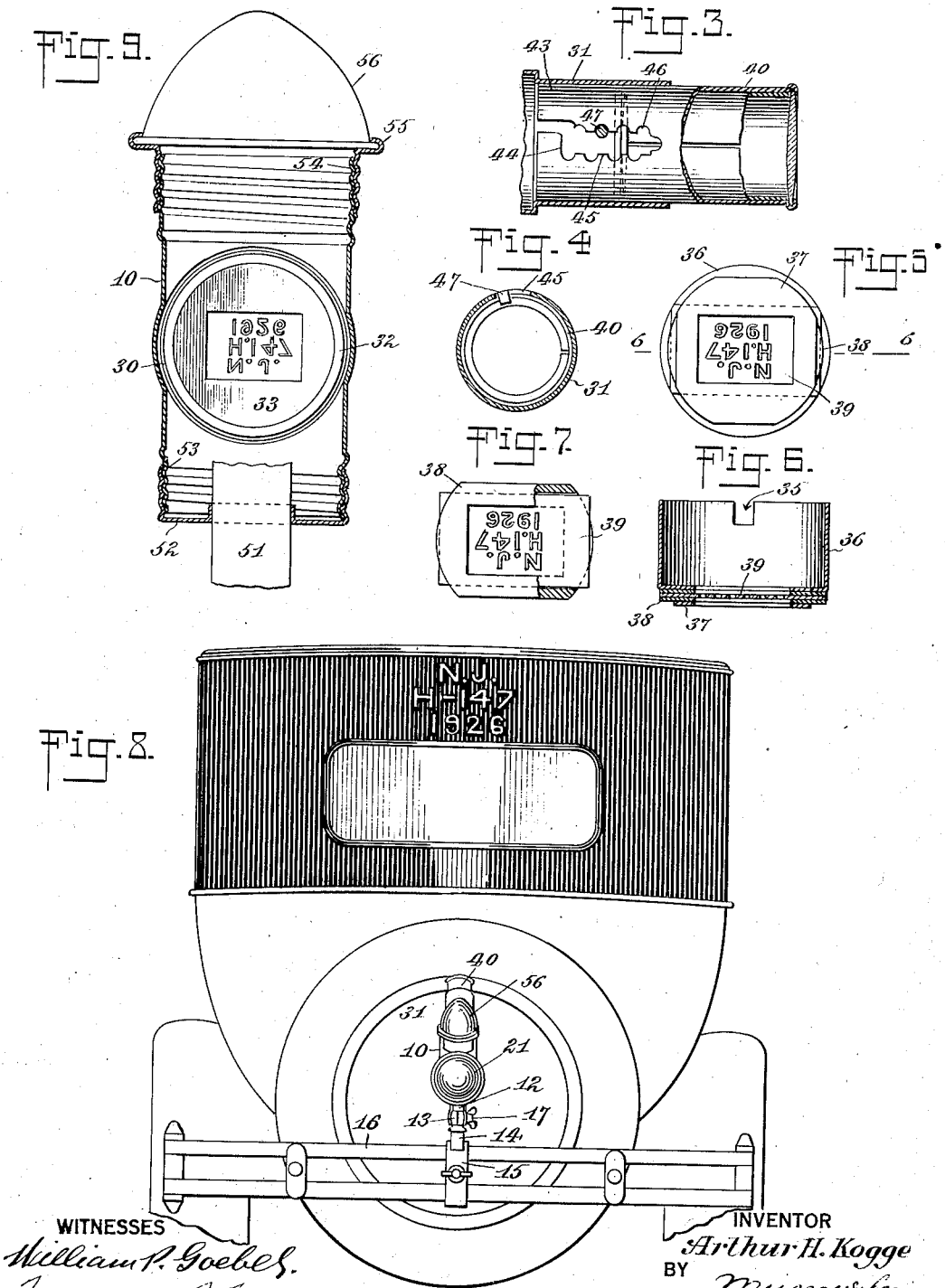
WITNESSES
INVENTOR
Arthur H. Kogge
BY
ATTORNEY Patented June 14, 1927.

1,632,607

UNITED STATES PATENT OFFICE.

ARTHUR H. KOGGE, OF JERSEY CITY, NEW JERSEY.

DISPLAY DEVICE.

Application filed October 26, 1926. Serial No. 144,314.

The present invention is concerned with the provision of a device which may have a wide range of utility, but which is primarily designed for prominently displaying the names of ships or the license numbers of automotive vehicles at night.

In accordance with a preferred embodiment of the invention, the device includes means for projecting the license number upon the rear of the vehicle, using the vehicle body as a screen on which to display in magnified form, the license number borne by a small slide associated with a projector.

Preferably the license displaying device is associated with the tail light of the car, and if desired a single casing may house the projector, tail light and brake operated stop light.

Objects of the invention are to provide a device of this character which may be conveniently attached to various types of automobiles and which will serve to display in properly enlarged form, the license numbers at any convenient location on the back of the car.

Further objects of the invention are to provide a device of this character of neat, attractive appearance, which will be simple and practical in construction, rugged, durable and efficient in use, and well suited to the requirements of economical manufacture and ready accessibility for purposes of repair or of replacing lights.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 3 is a view partly in elevation and partly in longitudinal section through the projector, with parts broken away for the sake of clearness.

Fig. 4 is a transverse sectional view on the line 4—4 of Fig. 2.

Fig. 5 is a view in front elevation of the license carrying member.

Fig. 6 is a transverse sectional view on the line 6—6 of Fig. 5.

Fig. 7 is a detail showing the plate-carrying frame removed from its holder.

Fig. 8 is a view in rear elevation of an automobile showing the device of the present invention in applied position and the license number projected on the rear of the car.

Fig. 9 is a vertical sectional view on the staggered line 9—9 of Fig. 2.

Figure 1:
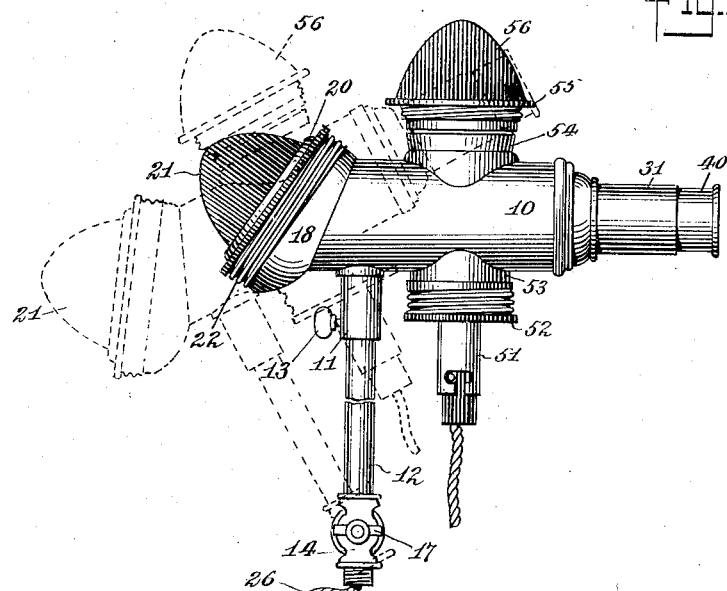
Fig. 1 is a view in side elevation showing a combined license display tail light and signal light embodied in a single casing, the dotted lines indicating the casing in adjusted position for purposes of license display.
Figure 2:
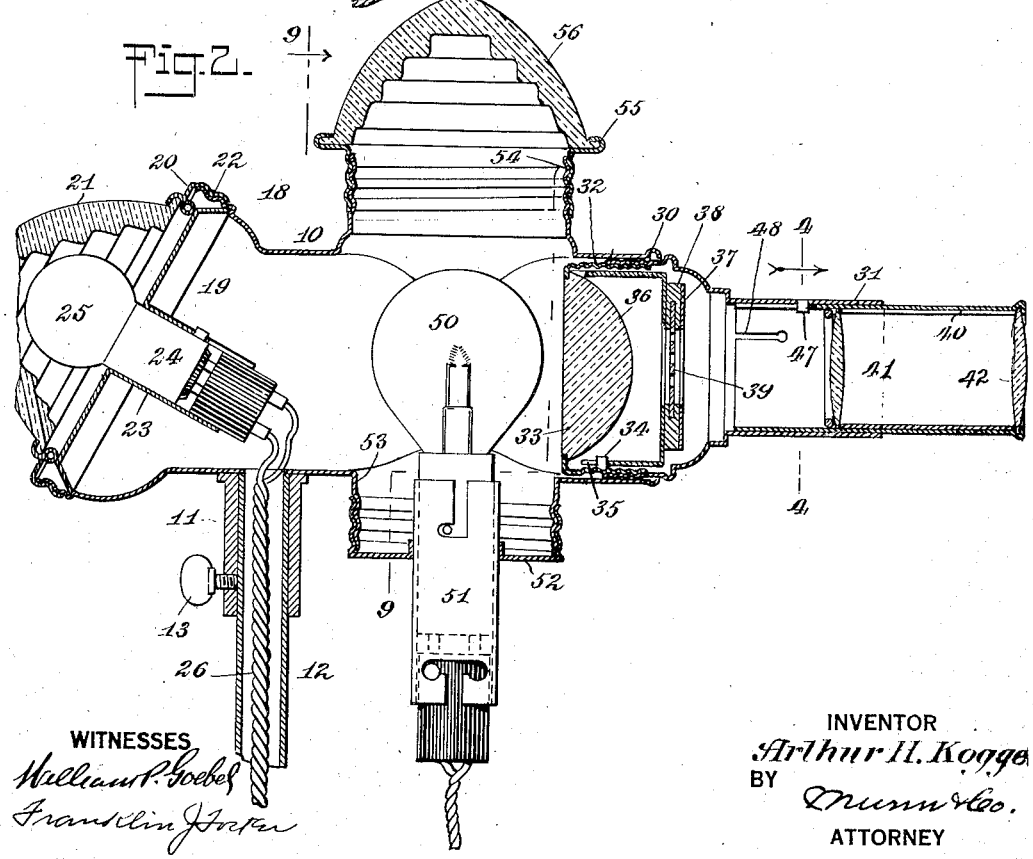
Fig. 2 is an enlarged longitudinal sectional view through the device.

In the drawings I have used the reference character 10 to designate the cylindrical body portion of the light casing of the present invention. This body portion is formed near one end with a depending bushing 11 rotatably adjustable on a hollow standard 12 by a set screw 13. This standard at its lower end is swivelly connected to a mounting member 14 adapted to be secured in any convenient manner to the rear of a vehicle. As shown in Fig. 8, the mounting member 14 is connected to a clamp 15 on the rear bumper 16. The standard may be bodily adjusted by a thumb nut 17 which connects it to the mounting member and tilted from the vertical position of Fig. 1 to the dotted line position of the same figure. In fact, even a greater range of tilting may be had, and the body 10 may be rotatably adjusted about the standard 12 and locked in adjusted position by the set screw 13.

The body at its rear end is formed with a flaring externally threaded mouth portion 18, the central axis of which is disposed at a slight angle to the longitudinal axis of the cylinder 10. A reflector or partition plate 19 is retained in the enlarged portion 18 of the body 10 by the use of a lens rim 20 holding a lens 21 in place and formed with a flange 22 which screws over the mouth 18. Mounted in a central tubular extension 23 of the partition plate or reflector 19 is a conventional socket 24 for a lamp bulb 25. Bulb 25 serves as the brake operated stop light, and the lead wires 26 therefrom may be run through the hollow standard 12.

The opposite end of the cylindrical body 10 receives the threaded flange portion 30 of a projector tube 31. This flange has threaded engagement with a cup-shaped lens holder 32 carrying a magnified lens 33. Lens holder 32 is formed with an inwardly projecting lug 34 adapted to enter a slot 35 in a cup-shaped license plate carrier 36 facing in an opposite direction from the cup-shaped member 32 and nested therein.

The license plate holder is formed with an offset frame portion 37 cooperating with the body of the holder to define a guideway into which a frame member 38 carrying the license plate 39 may be slid. License plate 39 as illustrated, is simply in the nature of a stencil having the license numbers stamped out. Although it is to be understood that it might comprise any opaque member with transparent characters thereon.

Mounted for sliding adjustment in the projector tube 31 is a telescope 40 carrying lenses 41, 42. A rearward extension 43 of the telescope is formed with a bayonet slot 44 therein communicating with a longitudinally extending slot 45 having a series of notches 46 in its edges in any of which a pin 47 projecting inwardly from the tube 31 is adapted to seat.

The general bayonet shape of the slit in the telescope extension prevents the telescope from being accidentally pulled entirely out of the tube, while the notches provide means for locking the telescope in any desired position of adjustment. Preferably the extension 43 in addition to the slot above described, is slit as indicated at 48 defining a series of spring tongues which tend to circumferentially expand and tightly grip the tube 31. Thus the telescope is held against vibration.

The number displayed on the license plate is projected on the rear of the car as indicated in Fig. 3 by the use of a projector lamp 50 disposed centrally of the body 10. This lamp may be carried by the usual socket 51 mounted in a cap 52 screwed on to a threaded extension 53 at the bottom of the body. Preferably extension 53 is aligned with a similar extension 54 at the top of the body upon which a lens rim 55 is screwed, this rim carrying a lens 56 which serves as the tail light of the car.

By rocking the standard 12 about its pivot, rotating the body on the standard and adjusting the telescope in and out, it is a very simple matter to properly focus the numbers of the license plate on the back of the car as shown in Fig. 8. The novel lamp casing enables me to combine this license projecting feature if desired with the usual tail light and stop light of the car.

All of the lenses, the bulbs, the telescope and the license plate holder may be readily removed by the simple expedient of unscrewing or sliding out a few parts. New license plates may be conveniently substituted for old ones, at the beginning of each year.

Obviously the device which I have shown in the drawings illustrates simply one preferred embodiment of the invention, and an infinite variety of changes and alterations might be made in the general form and arrangement of the parts described without departing from the invention, hence I do not wish to limit myself to the details set forth, but shall consider myself at liberty to make such changes and alterations as fairly fall within the spirit and scope of the appended claims.

The device, either with or independently of the signal lamps, may be used for various purposes other than the display of license plates.

I claim:

1. A license display device for automotive vehicles including a casing and a plate therein having a license number adapted to be projected on the body of the vehicle, a lamp in the casing, projecting and magnifying lenses in the casing, adjustable means for focussing the image of the plate on the body of the vehicle, a stop light lens in the casing screened from the light of the lamp and a second lamp for illuminating the stop light lens.

2. A license display device for automotive vehicles including a casing and a plate therein having a license number adapted to be projected on the body of the vehicle, a lamp in the casing, projecting and magnifying lenses in the casing, adjustable means for focussing the image of the plate on the body of the vehicle, a stop light lens in the casing screened from the light of the lamp and a second lamp for illuminating the stop light lens, said casing being cylindrical mounting the projector at one end and the stop light lens at the other end, the latter being inclined relatively to the transverse axis of the casing, whereby it will be disposed in a substantially vertical plane when the casing is tilted upwardly to throw the image on the upper part of the car body.

3. A casing having an opening therein, a lamp in the casing, an open ended tubular element secured in the opening, a telescope slidably adjustable in the tubular element, a license plate interposed between the telescope and lamp, a magnifying lens between the plate and lamp, said magnifying lens and plate being carried by oppositely facing cup-like members screwthreadedly connected together.

4. A casing having an opening therein, a lamp in the casing, an open ended tubular element secured in the opening, a telescope slidably adjustable in the tubular element, a license plate interposed between the telescope and lamp, a pin projecting inwardly from the tube and working in a bayonet slot in the telescope, the latter including notches in its edges selectively engagable with the pin.

5. An elongated generally cylindrical casing having openings in its opposite ends and including diametrically opposite open socket portions arranged intermediate its ends, a tail light lens arranged in the upper socket portion and a lamp socket arranged in the lower socket portion, an adjustable telescope mounted in one of the open ends of the casing, a magnifying lens and license bearing plate arranged between the telescope and a light source mounted in the light socket, a stop light lens arranged in the opposite open end of the casing, and screened from the light source for illuminating the tail light lens.

ARTHUR H. KOGGE.